United States Patent
Hirano et al.

[11] Patent Number: 5,940,631
[45] Date of Patent: *Aug. 17, 1999

[54] OPTICAL APPARATUS HAVING A VIBRATION COMPENSATION DEVICE OPERABLE DURING PHOTOGRAPHIC PREPARATIONS

[75] Inventors: Shinichi Hirano, Tokyo; Nobuhiko Terui, Ichikawa, both of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,904

[22] Filed: Feb. 27, 1997

Related U.S. Application Data

[63] Continuation of application No. 08/426,385, Apr. 21, 1995, abandoned.

[30] Foreign Application Priority Data

Jun. 17, 1994 [JP] Japan .................................. 6-135837
Jun. 17, 1994 [JP] Japan .................................. 6-135891

[51] Int. Cl.[6] .................................................. G03B 17/00
[52] U.S. Cl. .............................................................. 396/55
[58] Field of Search ........................................ 396/52, 55

[56] References Cited

U.S. PATENT DOCUMENTS

| | | | |
|---|---|---|---|
| 4,965,619 | 10/1990 | Shikaumi et al. . | |
| 5,146,263 | 9/1992 | Kataoka | 354/430 |
| 5,153,633 | 10/1992 | Otani | 354/430 |
| 5,245,378 | 9/1993 | Washisu | 354/410 |
| 5,337,098 | 8/1994 | Imafuji et al. | 354/70 |
| 5,420,661 | 5/1995 | Hamada et al. | 354/402 |
| 5,499,068 | 3/1996 | Satoh et al. | 354/106 |
| 5,623,326 | 4/1997 | Okano | 396/55 |
| 5,640,611 | 6/1997 | Kai et al. | 396/55 |

Primary Examiner—Russell Adams
Assistant Examiner—John Chizmar

[57] ABSTRACT

An optical apparatus having a lens device mounted on a body device, such that the lens device has a vibration compensation device located within the lens device. A mode switch is mounted on either the body device or the lens device and makes it possible to drive an optical lens which compensates for vibration of the optical apparatus at arbitrary times. Also, the mode switch enables vibration compensation of the viewfinder picture during preparations for taking a photograph and compensation of the vibration of an image on the picture plane of the optical apparatus during exposure of film in the optical apparatus.

19 Claims, 9 Drawing Sheets

| MODE SWITCH STATUS | VIBRATION COMPENSATION MODE | VIBRATION COMPENSATION MODE 1 OR 2 |
|---|---|---|
| (a) | VIBRATION COMPENSATION MODE ON | VIBRATION COMPENSATION MODE 2 |
| (b) | VIBRATION COMPENSATION MODE ON | VIBRATION COMPENSATION MODE 1 |
| (c) | VIBRATION COMPENSATION MODE OFF | |

FIG. 6

OPTICAL APPARATUS HAVING A VIBRATION COMPENSATION DEVICE OPERABLE DURING PHOTOGRAPHIC PREPARATIONS

This application is a continuation of application Ser. No. 08/426,385, filed Apr. 21, 1995, now abandoned.

BACKGROUND OF THE INVENTION

1. Field of the Invention

The present invention relates to an optical apparatus having a vibration compensation device equipped with vibration compensation functions and, more particularly, to an optical apparatus having a vibration compensation device which compensates for the effects of hand motion or other vibrations on the optical apparatus and is operable during photographic preparations.

2. Description of the Related Art

Autofocus (AF) devices have been common in conventional camera photographic equipment. The addition of vibration compensation devices to compensate for hand vibration of the camera photographic equipment has been proposed. Vibration compensation devices detect fluctuations in the angle along the optical axis caused by hand vibration or movements, and then compensate the photographic picture plane based on those fluctuations. Examples of such vibration compensation devices are disclosed in Japanese Patent No. JP 2-66535 (an example of a single lens optical system) and Japanese Patent No. JP 2-183217 (an example of image compensation by shifting a portion of a telescopic lens optical system).

In these conventional vibration compensation devices, image compensation due to vibration performed only during exposure is considered sufficient. However, the viewfinder image vibrates during photographic preparations, making observation difficult.

Also, because the AF device operates when the release switch is pressed to a half-depressed position, if the photographic preparations have begun, there is the possibility that the distance measurement would not be accurate if the object to be photographed is vibrating. Additionally, when performing multi-pattern light measurement, if the field is vibrating, the value of the measured light may vary due to fluctuations in the brightness of the partitioned areas.

To solve these types of problems it has been suggested to perform the vibration compensation function prior to exposure. However, by performing the vibration compensation function prior to exposure, the battery life will be shortened. The inventors have discovered the above-noted problems and have developed solutions to these problems.

SUMMARY OF THE INVENTION

Because the vibration compensation function is basically operated only during exposure, it is not necessary to perform the same high precision driving both before and during exposure.

Accordingly, it is an object of the present invention to provide a vibration compensation device, for a camera photographic equipment or other optical apparatus, which commands a vibration compensation driving unit to begin driving an optical lens which compensates for vibration at an arbitrary time.

It is another object of the present invention to provide a vibration compensation device which uses several different methods to command the vibration compensation drive unit to begin driving the optical lens.

Additional objects and advantages of the invention will be set forth in part in the description which follows, and, in part, will be obvious from the description, or may be learned by practice of the invention.

The foregoing objects of the present invention are achieved by providing an optical apparatus, such as a camera, with a vibration compensation device, a body device or lens device equipped with a photographic optical system, a vibration detection unit to detect vibration of the optical axis of the photographic optical system, and a vibration compensation driving unit to cause a relative shift of a portion of the entire photographic optical system and the photographic picture plane to compensate for image blur on the picture plane of the optical apparatus. The optical apparatus further includes a vibration compensation control unit to generate a vibration compensation control signal for the vibration compensation driving unit based on the output of the vibration detection unit, and a communications unit to communicate with the body and lens devices. The body device is equipped with a compensation start command unit to command the vibration compensation driving unit to begin driving the photographic optical system.

Several methods of vibration compensation control are possible by the vibration compensation control unit, and based on the different methods, the vibration compensation start command unit commands the vibration compensation driving unit to begin driving the photographic optical system.

Because the vibration compensation start command unit is attached to the body device, the vibration compensation drive unit can begin driving the photographic optical system at an arbitrary time, depending upon the intention of the photographer. Because the vibration compensation start command unit can also select the vibration compensation control method, the vibration compensation drive unit drives the photographic optical system according to a desired method.

Further, because the vibration compensation start command unit is attached to the body device, such as a camera body, the photographer's left hand can perform zoom-in and framing operations. By operating the vibration compensation start command unit, "shutter chances" will not be missed.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 is a chart illustrating a mode switching status of the compensation start command unit (mode switch) for the vibration compensation device according to the first embodiment of the present invention.

DESCRIPTION OF THE PREFERRED EMBODIMENTS

Figure 1:
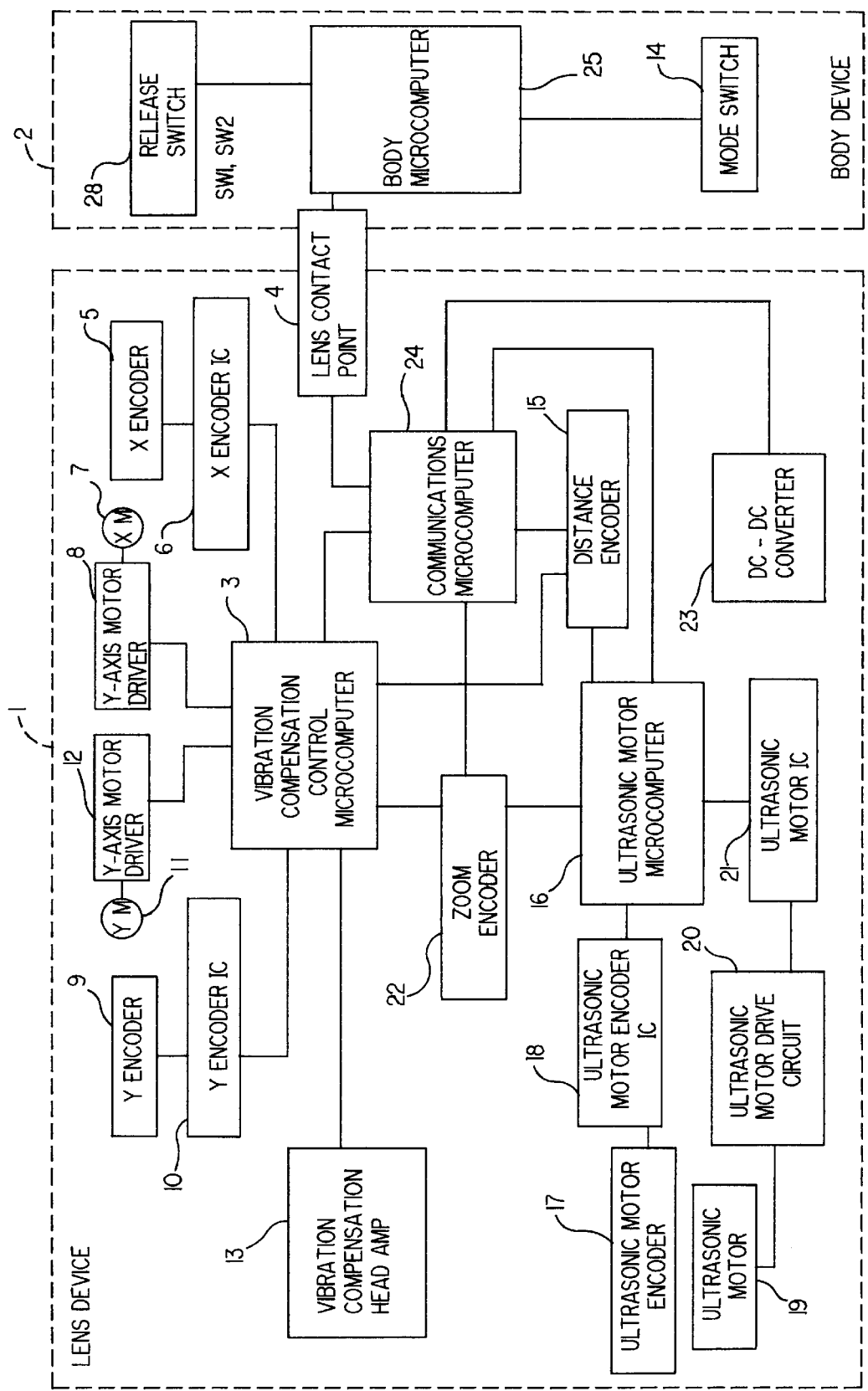
FIG. 1 is a block diagram of a vibration compensation device according to a first embodiment of the present invention.

Reference will now be made in detail to the present preferred embodiments of the present invention, examples of which are illustrated in the accompanying drawings, wherein like reference numerals refer to like elements throughout.

Figure 4:
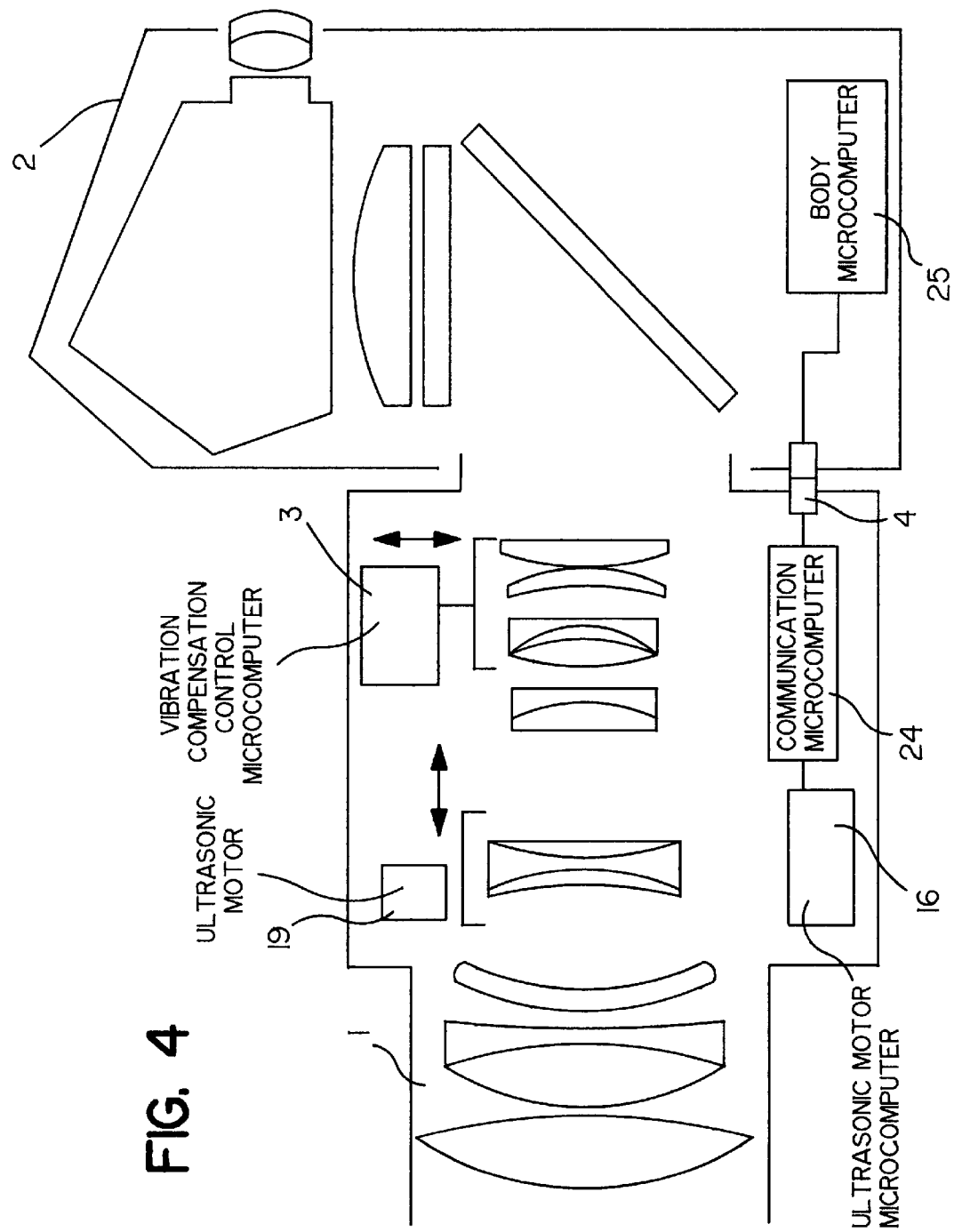
FIG. 4 is a cross-sectional view of a photographic optical system including the vibration compensation device according to the first embodiment of the present invention.

FIG. 1 is a block diagram of a vibration compensation device according to a first embodiment of the present invention. FIG. 4 is a cross-sectional view of photographic equipment including an optical system with the vibration compensation device according to the first embodiment of the present invention.

The vibration compensation device is integrated into photographic equipment comprising a lens device 1 and a body device 2. Lens device 1 is equipped with an anti-vibration control microcomputer 3, an ultrasonic motor microcomputer 16, and a communications microcomputer 24. Body device 2 is equipped with a body microcomputer 25.

Vibration compensation control microcomputer 3 controls the driving of the vibration compensation drive unit (X-axis drive motor 7, X-axis motor drive 8, Y-axis drive motor 11, Y-axis motor driver 12, etc.) based on optical system position data from X encoder 5, Y encoder 9, distance encoder 15, and zoom encoder 22 and from the output of the body microcomputer 25 of body device 1.

Lens contact point 4, belonging to a group of electrical contacts, is used to transmit signals to and from body device 2, and is connected to communications microcomputer 24.

X encoder 5 detects the amount the optical system moves along the X-axis, and outputs this value to X encoder IC 6. X encoder IC 6 converts the value of the amount that the optical system moves along the X-axis into an electrical signal. This electrical signal is sent to anti-vibration compensation control microcomputer 3. X-axis drive motor 7 is a drive motor to shift the X-axis image vibration compensation optical system and X-axis motor drive 8 is the circuit which drives X-axis drive motor 7.

In the same manner, Y encoder 9 detects the amount the optical system moves along the Y-axis, and outputs this value to Y encoder IC 10. Y encoder IC 10 converts the value of the amount that the optical system moves along the Y-axis into an electrical signal. This electrical signal is sent to vibration compensation control microcomputer 3. Y-axis drive motor 11 is a drive motor to shift the Y-axis image vibration compensation optical system and Y-axis motor drive 12 is the circuit which drives Y-axis drive motor 11.

Vibration compensation head amp 13 detects the amount of vibration, converts image vibration information into an electrical signal, and then sends that signal to vibration compensation control microcomputer 3. An angular velocity sensor, for example, may be used as vibration compensation head amp 13.

Distance encoder 15, connected to ultrasonic motor microcomputer 16 and to communications microcomputer 24, detects a focus position, converts this value into an electrical signal, and sends the output to vibration compensation control microcomputer 3. Ultrasonic motor microcomputer 16 controls ultrasonic motor 19 to drive the focus optical system driving unit (not shown in the drawing).

Ultrasonic motor (USM) encoder 17 detects the amount of movement of ultrasonic motor 19. The output is connected to ultrasonic motor (USM) encoder IC 18. USM encoder IC 18 determines the amount of movement of ultrasonic motor 19 and outputs an electrical signal as a result, the output being sent to ultrasonic motor microcomputer 16.

Ultrasonic motor 19 drives the focus optical system (not shown in the drawing). Using the fixed drive frequency of ultrasonic motor 19, ultrasonic motor drive circuit 20 generates two drive signals having a phase difference from one another of 90 degrees. Ultrasonic motor IC 21 performs the interface between ultrasonic motor microcomputer 16 and ultrasonic motor drive circuit 20.

Zoom encoder 22 detects the lens focus distance position, converts it into an electrical signal, and transmits this electrical signal to vibration compensation control microcomputer 3, ultrasonic motor microcomputer 16, and communications microcomputer 24.

DC—DC converter 23 supplies a steady DC voltage corresponding to battery voltage fluctuations and is controlled by a signal from communications microcomputer 24. Communications microcomputer 24 communicates with lens device 1 and body device 2, and dispatches commands to the other microcomputers within lens device 1, such as microcomputer 3, 15, etc.

Figure 5:
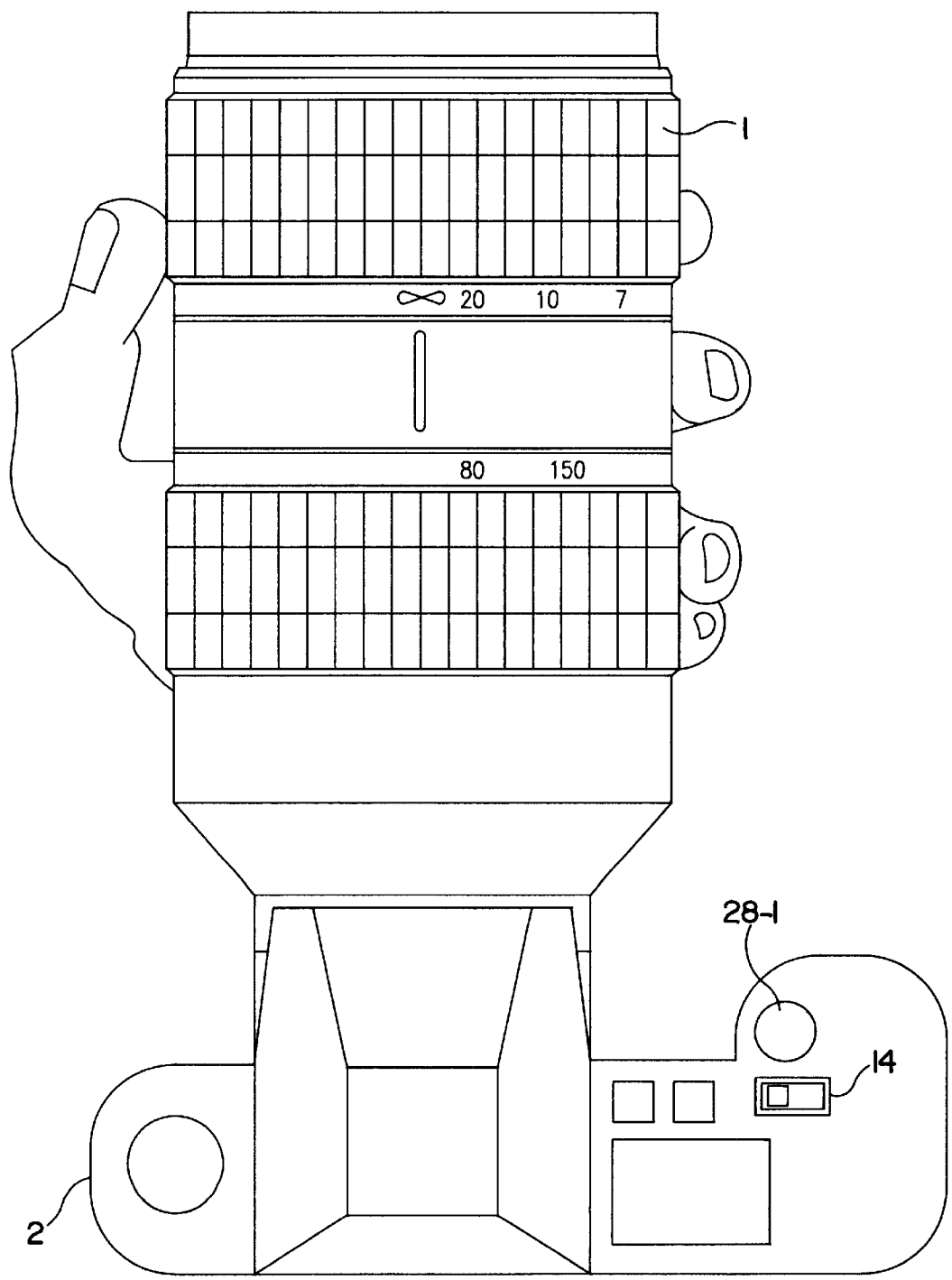
FIG. 5 is an external top view of the vibration compensation device according to the first embodiment of the present invention showing a location were a compensation start command unit (mode switch) is attached.

Body device 2 is equipped with body microcomputer 25, mode switch 14, and release switch 28. Body microcomputer 25 is a central processing device which controls autofocus (AF) and autoexposure (AE) photographic operations, vibration compensation control, etc. Mode switch 14 switches between vibration compensation drive ON/OFF, vibration compensation mode 1 and vibration compensation mode 2. In this embodiment, as shown in FIG. 5, mode switch 14 is mounted on body device 2 behind release button 28–1.

Also, as shown in FIG. 6, mode switch 14 can switch between three states. In the left-side position shown in setting (a), the vibration compensation mode is ON, and vibration compensation mode 2 is selected. In the middle position shown in setting (b), the vibration compensation mode is ON, and vibration compensation mode 1 is selected. In the left-side position shown in setting (c), the vibration compensation mode is OFF.

Vibration compensation mode 1 is a rough control mode to compensate for vibrations of the viewfinder image after photographic preparations have begun. Vibration compensation mode 2 is a precise control mode to compensate for vibrations during the actual time of exposure.

Release switch 28 (shown in FIG. 1), mounted on body device 2, comprises a half-depression position switch SW1 which starts the photographic preparations when release button 28–1 (shown in FIG. 5) is depressed halfway, and a full-depression position switch SW2 which commands the exposure control to begin when release button 28–1 is pressed to a full-depression position.

Figure 2:
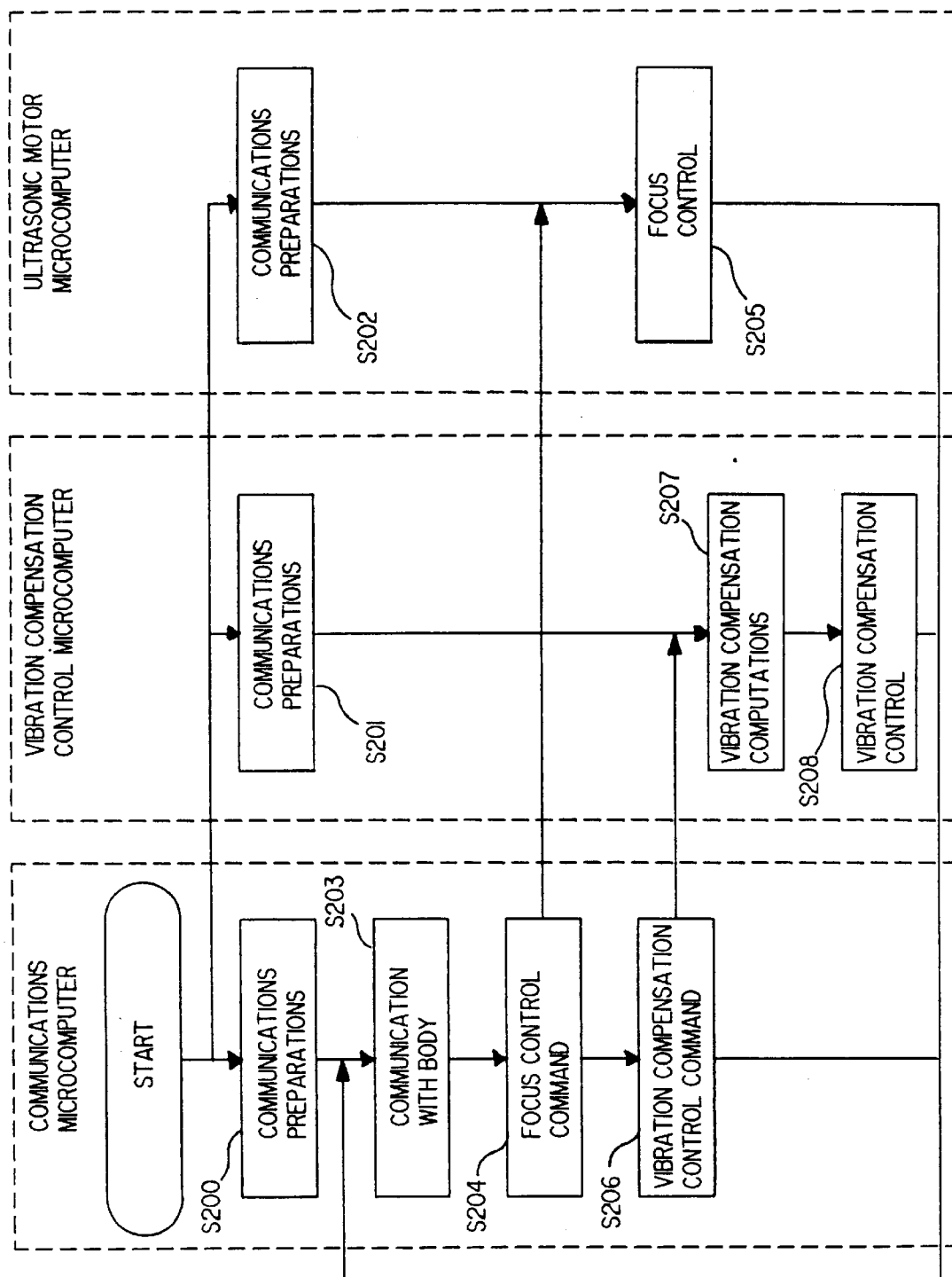
FIG. 2 is a flow chart showing an operation sequence of the vibration compensation device shown in FIG. 1.

FIG. 2 is a flow chart showing the operation sequence for the photographic equipment according to the first embodiment of the present invention. In S200, communications microcomputer 24 prepares for communication. Simultaneously, vibration compensation control microcomputer 3 prepares for communication in S201 and ultrasonic motor microcomputer 16 prepares for communication in S202. In S203, communications microcomputer 24 communicates with body device 2 through lens contact point 4. In S204, the focus control command received from the body device 2 is transmitted to ultrasonic motor microcomputer 16. In S205, ultrasonic motor microcomputer 16 performs focus control based on data from zoom encoder 22 and distance encoder 15.

In S206, the focus control command received from body device 2 is transmitted to vibration compensation control microcomputer 3. In S207, vibration compensation control microcomputer 3 performs vibration compensation computations. In S208, vibration compensation microcomputer 3 performs the actual vibration compensation.

Figure 3:
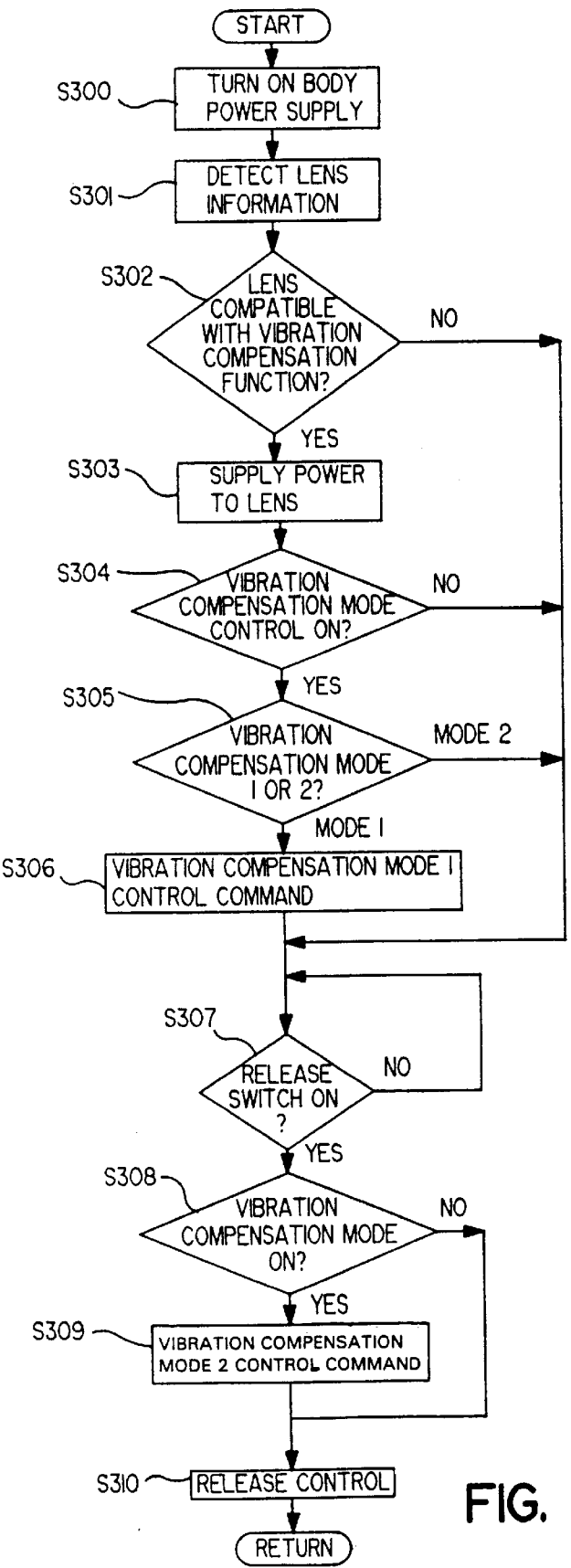
FIG. 3 is a flow chart showing an operation sequence of, and relationship between, vibration compensation control of the vibration compensation device and release control of photographic equipment according to the first embodiment of the present invention.

FIG. 3 is a flow chart showing the operation sequence of and relationship between the vibration compensation control of the vibration compensation device and the release control of the optical apparatus according to the first embodiment. In S300, the power supply for the body device 2 turns ON. In S301, body microcomputer 25 communicates with communication microcomputer 24 through lens contact 4 and detects lens data.

In S302, body microcomputer 25 determines whether lens device 1 is a vibration compensation function compatible lens based on lens data obtained in S301. If lens device 1 is not a vibration compensation function compatible lens, operation advances to S307 which is a judgment of whether release switch 28 is ON. If lens device 1 is a vibration compensation function compatible lens, then the operation proceeds to S303.

In S303, body microcomputer 25 supplies power to lens device 1 through lens contact 4. In S304, body microcomputer 25 reads the logic of mode switch 14 to determine whether the vibration compensation mode is ON or OFF. If the vibration compensation mode is OFF (refer to setting (c) in FIG. 6), operation advances to the judgment of release switch 28. If the vibration compensation mode is ON (refer to settings (a) and (b) in FIG. 6), then the operation proceeds to S305.

In S305, body microcomputer 25 reads the logic of mode switch 14 to determine the state of the vibration compensation device, vibration compensation mode 1 or vibration compensation mode 2. If vibration compensation mode 1 is set (see setting (b) of FIG. 6), then in S306, body microcomputer 25 will issue a vibration compensation mode 1 control command to communications microcomputer 24 through lens contact 4. If vibration compensation mode 2 is set (see setting (a) in FIG. 6), then the operation proceeds to S307 and it is determined whether release switch 28 is ON.

In S308, body microcomputer 25 reads the logic of mode switch 14 to determine whether the vibration compensation mode is ON or OFF. If the vibration compensation mode is OFF, the operation advances to S310, release control. If the vibration compensation mode is ON, the operation proceeds to S309. In S309, body microcomputer 25 issues a vibration compensation mode 2 control command to communications microcomputer 24 through lens contact point 4. In S310, body microcomputer 25 executes the film exposure control.

Figure 7:
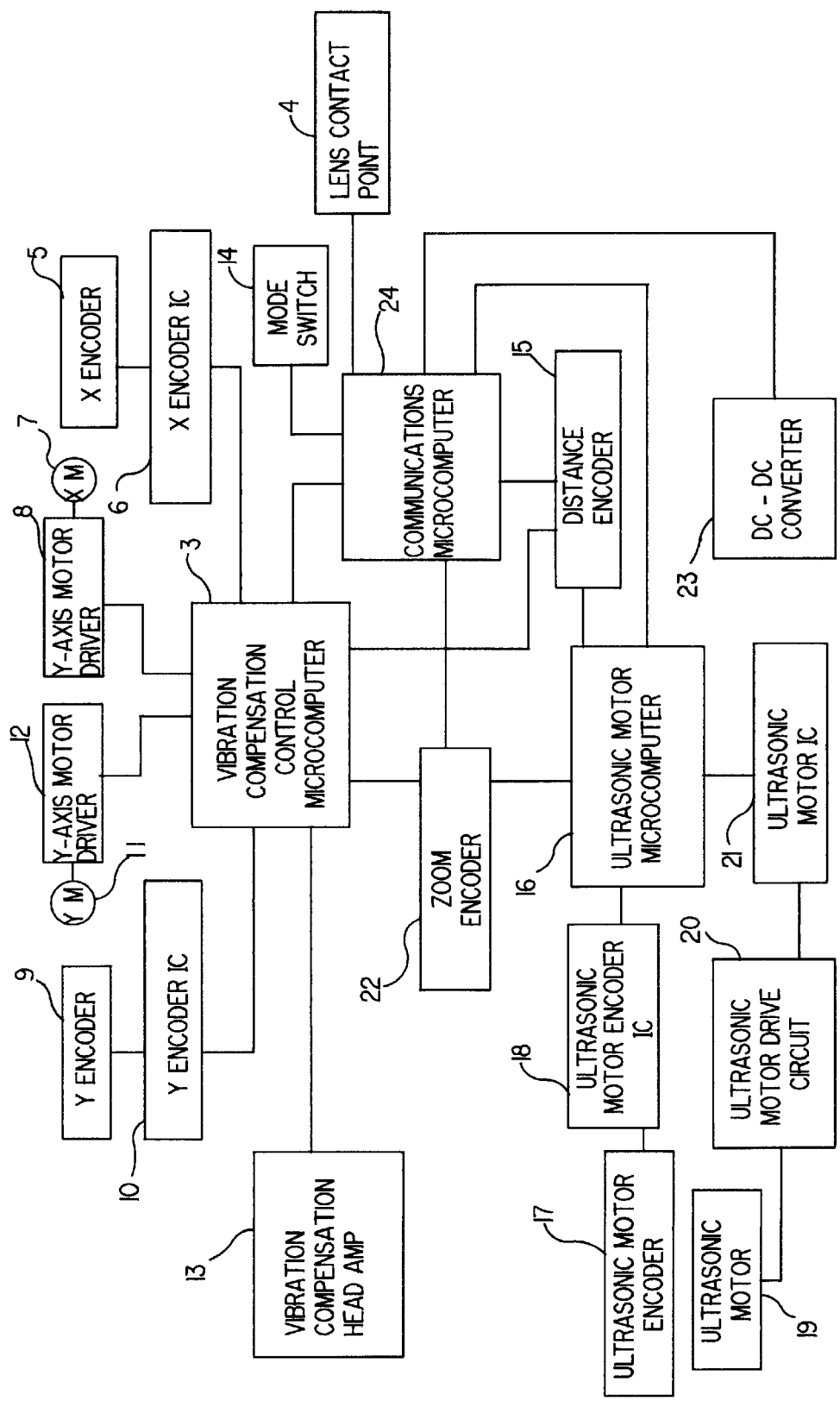
FIG. 7 is a block diagram of a vibration compensation device according to a second embodiment of the present invention.

FIG. 7 is a block diagram showing a vibration compensation device according to a second embodiment of the present invention. The elements of FIG. 7 perform in the same way as the elements with the same reference labels in FIG. 1. However, in FIG. 7, the mode switch 14 is not enclosed in the body device 2, but instead is part of the lens device 1.

Figure 8:
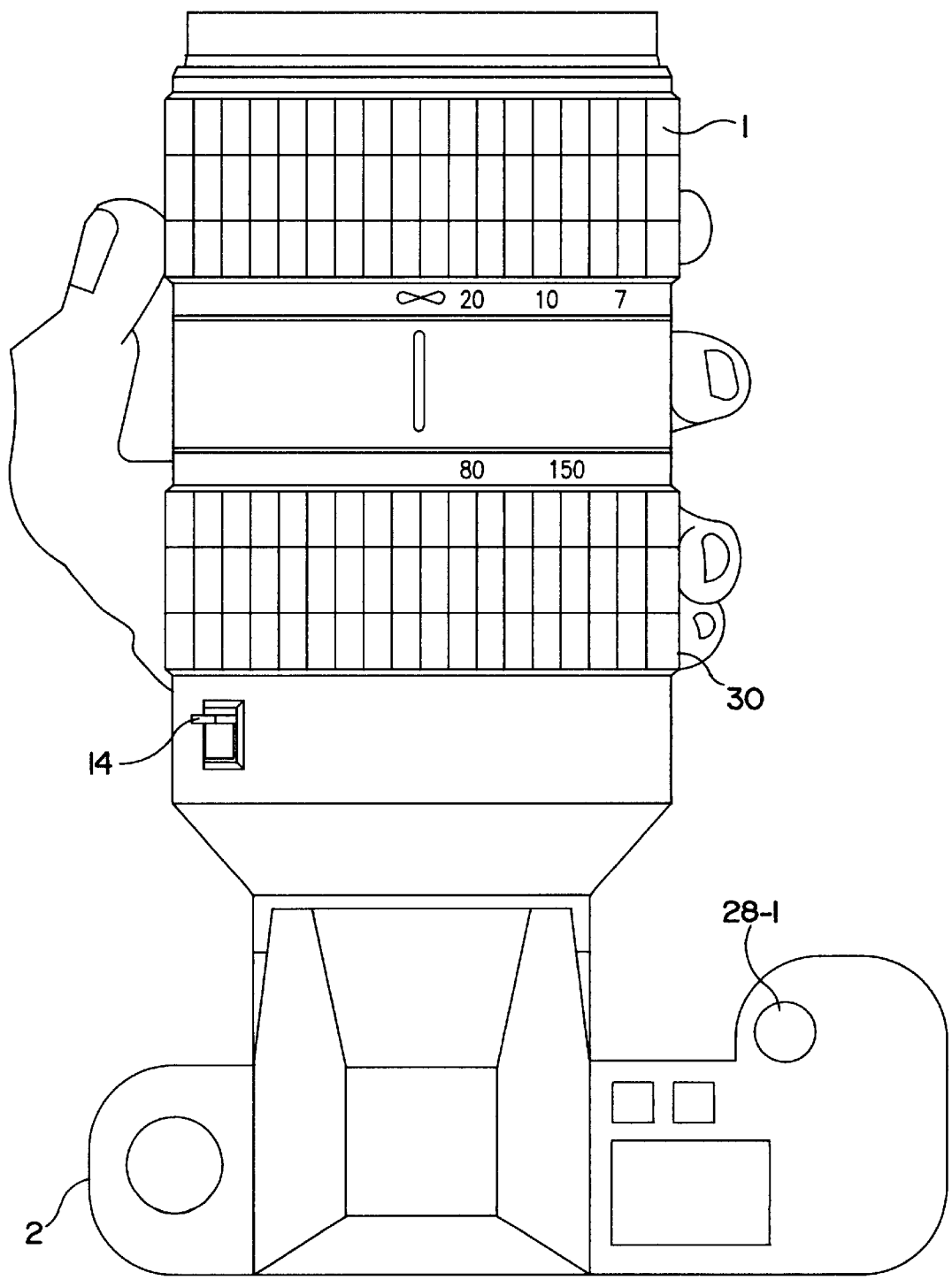
FIG. 8 is an external top view of the vibration compensation device according to the second embodiment of the present invention, showing a location where a compensation start command unit (mode switch) is attached.

FIG. 8 shows the mode switch 14 mounted on the lens device 1 in front of a zoom ring 30. The functions of the VR switch 14 shown in FIGS. 7 and 8 is the same as shown in FIG. 6. The operation sequence of the vibration compensation device according to the second embodiment operates in a similar fashion as the operation sequence of the vibration compensation device of the first embodiment as shown in FIG. 2.

Figure 9:
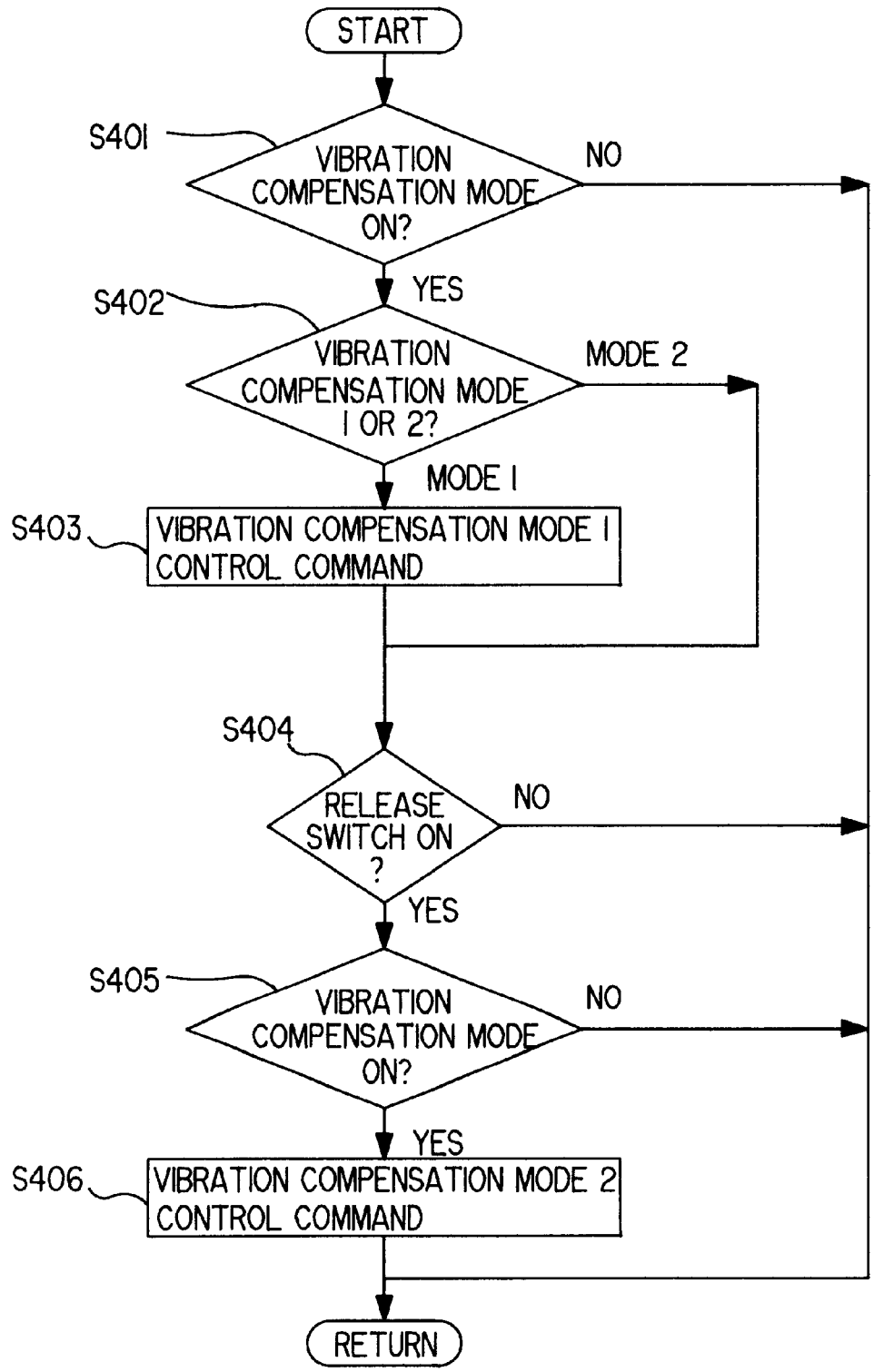
FIG. 9 is a flow chart showing an operation sequence of, and relationship between, vibration compensation control of the vibration compensation device and release control of photographic equipment according to a third embodiment of the present invention.

FIG. 9 is a flow chart showing an operation sequence for a third embodiment of vibration compensation control for the vibration compensation device of the present invention. Other configurations and operations (FIGS. 1, 2 and 4 through 8) are similar as in the third embodiment, and therefore repeated drawings and explanations have been omitted.

The third embodiment gives an example of vibration compensation control microcomputer 3, which is internal to the lens device, and which processes all of the vibration compensation control. In S401, vibration compensation microcomputer 3 reads the logic of mode switch 14, and determines whether the vibration compensation mode is ON or OFF. If the vibration compensation mode is OFF, the operation proceeds to the return step. If the vibration compensation mode is ON, operation proceeds to S402.

In S402, vibration compensation microcomputer 3 reads the logic of mode switch 14 to determine the state of the switch, either vibration compensation mode 1 or vibration compensation mode 2. If vibration compensation mode 1 is set, then a vibration compensation mode 1 control command is issued in S403. If vibration compensation mode 2 is set, then operation proceeds to S404 where release switch 28 is determined to be ON or OFF.

In S405, vibration compensation microcomputer 3 reads the logic of mode switch 14, and determines whether the vibration compensation mode is ON or OFF. If the vibration compensation mode is OFF, after returning, the operation advances to release control of body device 2. If the vibration compensation mode is ON, the operation proceeds to S406. In S406, vibration compensation microcomputer 3 issues a vibration compensation mode 2 control command. Then after returning, film exposure control for body device 2 is performed.

This invention is not limited to the above embodiments, and many variations and modifications are possible. For example, the above embodiments have been explained using a single reflex camera body device with a freely attachable lens and a body device. A compact camera body may also be used or one in which the lens can not be removed.

As explained in detail above, because a vibration compensation start command unit is attached to the body device, the vibration compensation drive unit can begin driving the optical lens at an arbitrary time, depending upon the intention of the photographer. Because the compensation start command unit can also select from different vibration compensation control methods, the vibration compensation drive unit can be driven according to the desired method. Further, because the compensation start command unit is attached to the body device, the photographer's left hand can perform zoom-in and framing operations. By operating the compensation start command unit, "shutter chances" will not be missed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical apparatus with a lens device and a body having a viewfinder, and receiving a recording medium, the optical apparatus comprising:

a photographic optical system, having an optical axis and formed in the lens device, to enable an image to reach the recording medium;

a vibration detection unit to detect vibration of the optical axis;

a vibration compensation unit to move said photographic optical system in a first mode of image blur compensation to compensate for the vibration of the optical axis during exposure of the recording medium, thereby removing blur of the image on the recording medium, and to move said photographic optical system in a second mode of image blur compensation to compensate for image blur in the viewfinder during picture preparations, wherein the first mode of image blur compensation is more precise than the second mode;

a vibration compensation control unit to generate a vibration compensation control signal to drive said vibration compensation unit based upon the vibration detected by said vibration detection unit; and a vibration compensation start command unit to initiate the second mode of image blur compensation at a desired time during the picture preparations and to initiate the first mode of image blur compensation at a time of exposure.

2. The optical apparatus as claimed in claim 1, wherein said vibration compensation start command unit comprises a mode switch formed on the body, said mode switch changing the first and second modes of said vibration compensation unit.

3. The optical apparatus as claimed in claim 2, further comprising a release button for inducing the picture preparations and the exposure of the recording medium, said release button being adjacent to said mode switch.

4. The optical apparatus as claimed in claim 1, wherein said vibration compensation start command unit comprises a mode switch formed on the body, said mode switch changing the modes of said vibration compensation unit between the first mode of image blur removal and the second mode of vibration compensation.

5. The optical apparatus as claimed in claim 1, wherein said vibration compensation start command unit comprises a mode switch formed on a periphery of the lens device, said mode switch changing the modes of said vibration compensation unit.

6. The optical apparatus as claimed in claim 5, wherein the lens device comprises a zoom ring, said zoom ring being adjacent to said mode switch.

7. The optical apparatus as claimed in claim 1, wherein said vibration compensation start command unit comprises a mode switch formed on a periphery of the lens device, said mode switch changing the modes of said vibration compensation unit between the first type of image blur removal and the second type of vibration compensation.

8. The optical apparatus as claimed in claim 1, wherein the optical apparatus is a single lens reflex camera.

9. The optical apparatus as claimed in claim 2, wherein the optical apparatus is a single lens reflex camera.

10. An optical apparatus with a lens device and a body having a viewfinder, and receiving a recording medium, the optical apparatus comprising:

a photographic optical system, having an optical axis and formed in the lens device, to enable an image to reach the recording medium;

a vibration detection unit to detect vibration of the optical axis;

a vibration compensation unit to move said photographic optical system in a first mode of image blur compensation to compensate for the vibration of the optical axis, thereby removing blur of the image on the recording medium, and to move said photographic optical system in a second mode of image blur compensation to compensate for image blur in the viewfinder during picture preparations, wherein the first mode of image blur compensation is more precise than the second mode;

a vibration compensation control unit to generate a vibration compensation control signal to drive said vibration compensation unit based upon the vibration detected by said vibration detection unit; and a vibration compensation start command unit to initiate the second mode of image blur compensation at a desired time prior to exposure of the recording medium.

11. The optical apparatus as claimed in claim 10, wherein said vibration compensation start command unit comprises a mode switch formed on the body, said mode switch changing the first and second modes of said vibration compensation unit.

12. The optical apparatus as claimed in claim 11, further comprising a release button for inducing the picture preparations and the exposure of the recording medium, said release button being adjacent to said mode switch.

13. The optical apparatus as claimed in claim 10, wherein said vibration compensation start command unit comprises a mode switch formed on a periphery of the lens device, said mode switch changing the modes of said vibration compensation unit.

14. An optical apparatus to enable an image to be viewed in a viewfinder, said optical apparatus comprising:

a vibration compensating device to detect vibration of the optical apparatus and to compensate for blur of the image in the viewfinder during picture preparations; and a vibration compensation start command unit to initiate compensation for the image blur in the viewfinder at a desired time during the picture preparations;

wherein said vibration compensation start command unit initiates a first mode of image blur removal in the viewfinder during the picture preparations and initiates a second mode of compensation for the vibration of the optical axis during exposure of the recording medium, the second mode being more precise than the first mode.

15. The optical apparatus as claimed in claim 14, wherein:

said vibration compensating device compensates for vibration of an optical axis of said optical apparatus during exposure; and said vibration compensation start command unit initiates performance of said vibration compensating device.

16. The optical apparatus as claimed in claim 15, wherein said vibration compensation start command unit comprises a mode switch formed on the body, said mode switch changing the modes of said vibration compensating device between the image blur removal and the vibration compensation of the optical axis.

17. The optical apparatus as claimed in claim 15, further comprising:
- a lens device which forms a part of said vibration compensating device; and
- said vibration compensation start command unit comprising a mode switch formed on a periphery of the lens device, said mode switch changing the modes of said vibration compensating device between the image blur removal in the viewfinder and the vibration compensation of the optical axis.

18. An optical apparatus having a viewfinder, and receiving a recording medium, the optical apparatus comprising:
- a photographic optical system, having an optical axis, to enable an image to reach the recording medium;
- a vibration detection unit to detect vibration of the optical axis;
- a vibration compensation unit to move said photographic optical system to compensate for the vibration of the optical axis during exposure of the recording medium, thereby compensating for image blur on the recording medium, and to compensate for image blur in the viewfinder during picture preparations, based upon the vibration detected by said vibration detection unit;
- a mode switch changing unit to switch the vibration compensation unit between a first mode and a second mode, wherein the vibration compensation unit performs a first degree of compensation for the image blur in the viewfinder during picture preparations in the first mode, and performs a second degree of compensation, more precise than the first degree, for the image blur on the recording medium during exposure of the recording medium in the second mode.

19. An optical apparatus having a viewfinder, and receiving a recording medium, the optical apparatus comprising:
- a photographic optical system, having an optical axis, to enable an image to reach the recording medium;
- a vibration detection unit to detect vibration of the optical axis;
- a vibration compensation unit to move said photographic optical system to compensate for the vibration of the optical axis during exposure of the recording medium, thereby compensating for image blur on the recording medium, and to compensate for image blur in the viewfinder during picture preparations, based upon the vibration detected by said vibration detection unit;
- a mode switch changing unit to switch the vibration compensation unit between a first mode and a second mode, wherein the vibration compensation unit performs a first degree of compensation for the image blur in the viewfinder during picture preparations and performs a second degree of compensation, more precise than the first degree, for the image blur on the recording medium during exposure of the recording medium in the first mode, and only performs the second degree of compensation for the image blur on the recording medium during exposure of the recording medium in the second mode.

* * * * *